(12) United States Patent
Ono et al.

(10) Patent No.: US 7,424,336 B2
(45) Date of Patent: Sep. 9, 2008

(54) TEST DATA ANALYZING SYSTEM AND TEST DATA ANALYZING PROGRAM

(75) Inventors: Makoto Ono, Yokohama (JP); Junko Konishi, Yokohama (JP)

(73) Assignee: Hitachi High Technologies Corporation, Tokyo (JP)

( * ) Notice: Subject to any disclaimer, the term of this patent is extended or adjusted under 35 U.S.C. 154(b) by 0 days.

(21) Appl. No.: 11/483,740

(22) Filed: Jul. 11, 2006

(65) Prior Publication Data

US 2007/0021855 A1    Jan. 25, 2007

(30) Foreign Application Priority Data

Jul. 11, 2005    (JP) .............................. 2005-201046

(51) Int. Cl.
*G06F 19/00*    (2006.01)
(52) U.S. Cl. .................. 700/108; 700/109; 700/110
(58) Field of Classification Search ......... 700/108–110, 700/121; 324/500, 765; 438/14, 17
See application file for complete search history.

(56) References Cited

U.S. PATENT DOCUMENTS

| | | | |
|---|---|---|---|
| 6,535,776 B1 * | 3/2003 | Tobin et al. ................. | 700/110 |
| 6,643,592 B1 * | 11/2003 | Loman et al. ................. | 702/35 |
| 6,804,563 B1 * | 10/2004 | Lafaye de Micheaux ...... | 700/51 |
| 6,909,927 B2 * | 6/2005 | Nguyen ...................... | 700/110 |
| 7,174,281 B2 * | 2/2007 | Abercrombie ................ | 703/2 |
| 7,337,033 B1 * | 2/2008 | Ontalus et al. .............. | 700/109 |
| 2003/0182252 A1 * | 9/2003 | Beinglass et al. ............. | 706/45 |

FOREIGN PATENT DOCUMENTS

| JP | 11-045919 | 2/1999 |
|---|---|---|
| JP | 2000-012640 | 1/2000 |

* cited by examiner

*Primary Examiner*—Alexander J Kosowski
(74) *Attorney, Agent, or Firm*—Antonelli, Terry, Stout & Kraus, LLP.

(57) ABSTRACT

Disclosed is a test data analyzing method and system for use in estimation of a defect cause of a product, such as, an integrated circuit, a liquid crystal display, an optical transceiver, a thin film magnetic head, etc., which is fabricated through plural processes. The estimation of a defect cause is achieved by selecting a wafer number to be analyzed, reading test data, reading fabrication line data, counting frequency of machine codes by wafers, grouping test data by machine codes or frequencies, comparing test data distributions between groups by machine codes, and comparing results between machine codes.

6 Claims, 8 Drawing Sheets

FIG.3

111, CVD machine I
112, CVD machine II
121, Coating/developing machine I
122, Coating/developing machine II
131, Photolithography machine I
132, Photolithography machine II
133, Photolithography machine III
134, Photolithography machine IV
141, Etching machine I
142, Etching machine II
143, Etching machine III
151, Ion planter I
152, Ion planter II
161, Cleaning machine I
162, Cleaning machine II
163, Cleaning machine III
171, Resist stripping machine I
172, Resist stripping machine II
173, Resist stripping machine III
181, Sputtering machine I
182, Sputtering machine II
191, Diffusion machine I
192, Diffusion machine II
201, Grinding machine I
202, Grinding machine II
211, Defect inspection machine
221, Critical dimension measurement machine
231, Tester I
232, Tester II
233, Tester III

FIG.4

```
[Header]
Grade name, ASIC-001
Wafer number, A1540-03
No. of processes, 520
[Data]
2004/02/01 10:00:00, 10010, 151, LOCOS (Local Oxidation of Silicon) surface oxidation
2004/02/01 15:00:00, 10020, 112, LOCOS film
2004/02/01 21:00:00, 10030, 221, Inspection C
2004/02/02 00:00:00, 10040, 122, LOCOS coating
2004/02/02 02:00:00, 10050, 132, LOCOS photolithography
2004/02/02 03:00:00, 10060, 122, LOCOS developing
2004/02/02 08:00:00, 10070, 141, LOCOS etching
2004/02/02 10:00:00, 10080, 172, LOCOS resist stripping (Omit)

2004/02/19 07:00:00, 14080, 161, Contact cleaning B
2004/02/19 13:00:00, 14090, 181, Wiring 2 sputtering
2004/02/19 14:00:00, 14100, 211, Inspection J
2004/02/19 15:30:00, 14110, 162, Wiring 2 cleaning A
2004/02/19 19:00:00, 14120, 122, Wiring 2 coating
2004/02/19 21:00:00, 14130, 131, Wiring 2 photolithography
2004/02/19 23:00:00, 14140, 122, Wiring 2 developing
2004/02/20 02:00:00, 14150, 141, Wiring 2 etching
2004/02/20 04:30:00, 14160, 172, Wiring 2 resist stripping
2004/02/20 07:00:00, 14170, 161, Wiring 2 cleaning B
2004/02/20 11:00:00, 14180, 221, Inspection K (Omit)

2004/02/27 08:00:00, 15190, 232, Test A
2004/02/27 08:00:00, 15200, 233, Test B
```

FIG.5

[Header]
Grade name, ASIC-001
Wafer number, A1540-03
[Inspection Step]
Inspection J, Test A-Yield, Test B-Yield
[Data]
0.53, 90, 91

~ 271

[Header]
Grade name, ASIC-001
Wafer number, A1541-02
[Inspection Step]
Inspection K, Test A-Yield, Test B-Yield
[Data]
48, 73, 87

| Wafer number | Inspection J | Inspection K | Test A Yield | Test B Yield |
|---|---|---|---|---|
| A1540-02 | - | 83 | 83 | 89 |
| A1540-03 | 0.53 | - | 90 | 91 |
| A1540-04 | - | 48 | 81 | 88 |
| A1541-02 | 0.51 | - | 73 | 87 |
| A1541-03 | - | 94 | 77 | 90 |
| A1541-04 | 0.48 | - | 79 | 93 |
| A1543-02 | - | 40 | 88 | 91 |
| A1543-03 | 0.49 | - | 81 | 86 |
| A1543-04 | - | 55 | 78 | 88 |
| A1544-02 | 0.50 | - | 69 | 90 |
| A1544-03 | - | 63 | 68 | 93 |
| A1544-04 | - | - | 66 | 94 |
| A1546-02 | - | 21 | 75 | 91 |
| A1546-03 | 0.51 | - | 76 | 90 |
| A1546-04 | - | - | 70 | 89 |
| A1547-02 | - | - | 64 | 93 |
| A1547-04 | - | - | 59 | 95 |
| A1548-02 | - | - | 88 | 96 |
| A1548-03 | - | - | 89 | 87 |
| A1548-04 | - | - | 90 | 97 |

Product: ASIC-001
Base Date: TEST A Yield
From: 2004/02/01
To: 2004/02/03
2 digits after wafer number: 01 02 03 04 05

SEARCH
ANALYSIS
PRINT
CLOSE though one product is completely done, one photoli-
thography machine may be used plural times for photolithog-
raphy process. In addition, one etching machine may be used
plural times for etching process. Generally, there are plural
photolithography machines or plural etching machines in a
plant and fabricating machines used differ by wafers or pro-
cesses.

To achieve the above object, in one aspect of the invention,
there is provided a method for estimating a defect cause in the
light of usage frequency of fabricating machines. One means
for such purpose is to build a test data analyzing system
including: a fabrication line data management unit, which
stores fabrication line data with information of machine code
numbers specifying fabrication machines of a fabrication
process a product (for example, a wafer) passes through; a test
data management unit, which stores test data obtained from
an inspection done on the product by an inspection machine;
a data analysis unit, which counts the showing frequency of
the respective machine code numbers included in correspond-
ing fabrication line data per product, analyzes correlation
between the showing frequency and the test data, and esti-
mates a defect cause of the product; and a local area network
(LAN), which connects the fabrication line data management
unit, the test data management unit, and the data analysis unit.
More details are described in the claims.

According to the aspect of the invention, it is possible to
estimate a defect cause with expedition by utilizing fabrica-
tion line data which includes code numbers of machines a
product passes through and test data obtained through an
inspection on the product.

TEST DATA ANALYZING SYSTEM AND TEST DATA ANALYZING PROGRAM

BACKGROUND OF THE INVENTION

1. Field of the Invention

The present invention relates to a test data analyzing
method and system for use in estimation of a defect cause
(defective process) of a product which is obtained through
multi-step processes, such as, fabrication processes of inte-
grated circuits, liquid crystal displays, optical transceivers,
thin film magnetic heads, etc.

2. Description of the Related Art

Fabrication process of integrated circuits will be explained
as an example. In general, fabrication process of integrated
circuits is divided into initial process steps for forming plural
chips on a silicon wafer and after process (or post process)
steps for cutting individual chips, molding, and product fin-
ishing. Usually, in an electrical test that is performed at the
last step of the initial process, a defective chip is found and
only good quality chips proceed to the post process.

Particularly in the initial process, the ratio of good quality
chips determined by the electrical test on every chip is called
the percentage of good products, i.e., yield. Increasing this
yield is very important in the initial process manufacture line
especially for realizing low-cost production.

Many methods have been suggested to estimate defect
cause(s) (defective process) aiming to increase yield. Among
them is an analysis of the relation between a fabricating
machine a product (wafer) passes through and test data. This
method, as described in Japanese Patent Laid-open Publica-
tion (JP-A) Nos. 2000-12640 and H11-45919, analyzes a
significant difference among plural fabricating machines
used in the same process.

JP-A No. 2000-12640 discloses a method for analyzing, on
the basis of ANOVA (Analysis of variance), the relation
between fabricating machines a wafer passes through and a
yield provided from an electrical test and for searching a
process with a significant difference in the machines.

JP-A No. H11-45919 discloses a method for discovering a
significant difference among fabricating machines by com-
paring coordinates of particles detected through a particle
inspection which is carried out by each fabricating machine a
wafer passes through. However, the above-described meth-
ods for discovering a significant difference among the fabri-
cating machines are on the basis of an assumption that plural
fabricating machines exist in one process.

To be short, JP-A Nos. 2000-12640 and H11-45919 pro-
vide a method for calculating a significant difference among
fabricating machines. For this reason, in the case that a certain
process uses one single fabricating machine for example, one
cannot figure out a significant difference among fabricating
machines for that process and the significant difference must
be obtained outside of the estimated object of a defect cause
(defective process).

SUMMARY OF THE INVENTION

It is, therefore, an object of the invention to provide a
technique for estimating a defect cause (defective process)
without calculating a significant difference among machines.

Particularly, the invention focuses on characteristics of a
fabrication process of a product. Fabrication process of a
subject with a multilayer structure, e.g., integrated circuits,
liquid crystal displays, optical transceivers, thin film mag-
netic heads, etc., is characterized by operating the same fab-
ricating machine plural times for similar processes. For

BRIEF DESCRIPTION OF THE DRAWINGS

The above objects, features and advantages of the present
invention will become more apparent from the following
detailed description when taken in conjunction with the
accompanying drawings, in which:

FIG. 3 illustrates a definition list of machine code numbers;

FIG. 4 illustrates fabrication line data by wafers;

FIG. 5 illustrates test data by wafers;

FIG. 6 illustrates one example of Graphical User Interface;

DETAILED DESCRIPTION OF THE PREFERRED EMBODIMENT

A preferred embodiment of the present invention will now
be described with reference to the accompanying drawings.

The embodiment to be described hereinafter is to be
applied to the fabrication process of an IC on a silicon wafer.

Figure 2:
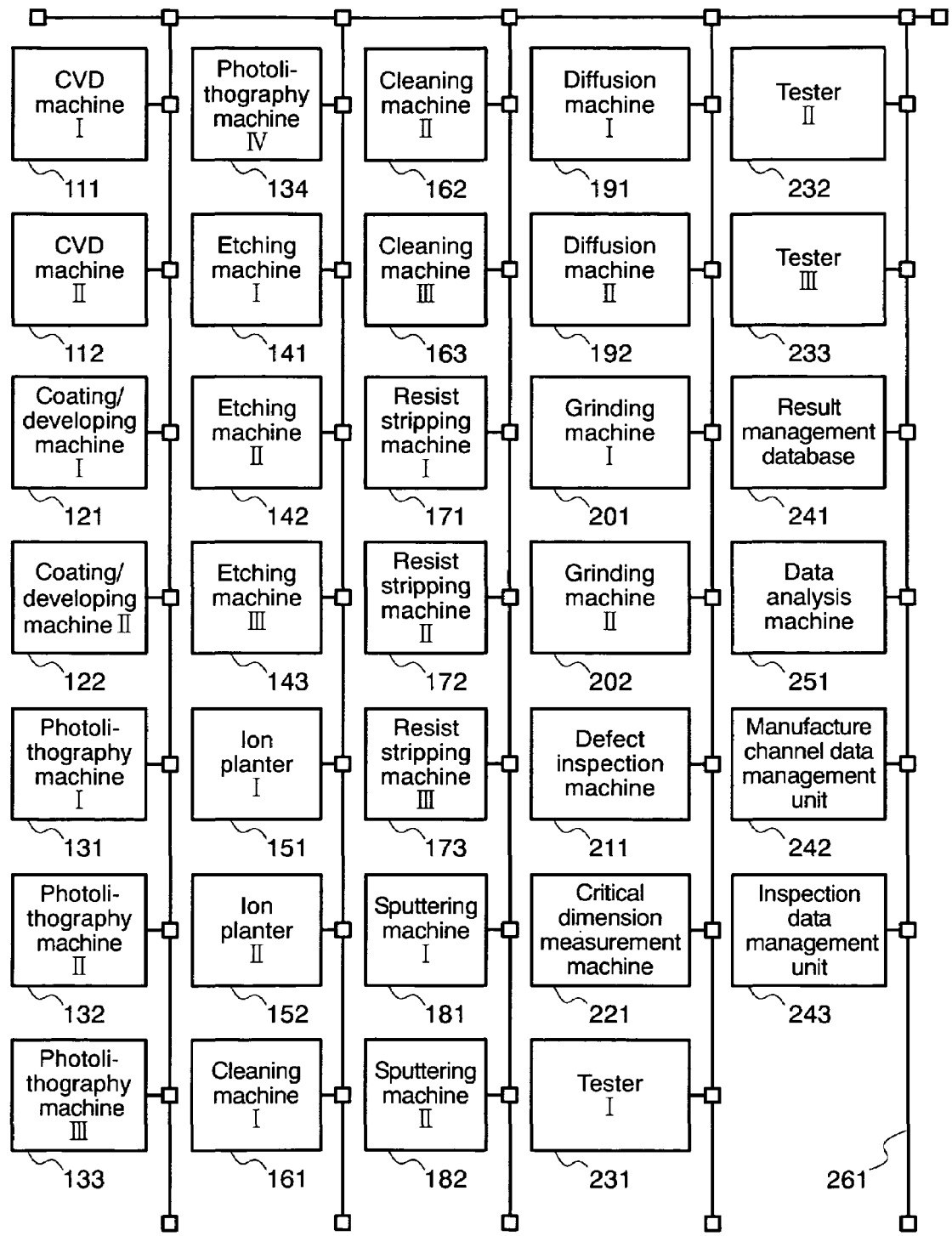
FIG. 2 is a block diagram of a fabrication machinery group
for use in a fabrication line.

To explain the embodiment, FIG. 2 illustrates a block dia-
gram of a fabrication machinery group for use in the fabrica-
tion line. In the fabrication line, all kinds of fabrication
machines are connected to a local area network (LAN) 261 or
a supplementary terminal is connected to each fabrication
machine. When a certain process is carried out on a wafer by
a fabrication machine, its result is transmitted and stored in a
result management database 241 from each fabrication
machine through the LAN 261. In the invention, the data in the result management database 241 is searched, transmitted and analyzed by a data analysis machine 251.

Particularly the invention is characterized by recording 'result data that indicates which fabrication machine performs which process on which wafer' as 'fabrication line data of a wafer' among the process result data on a wafer transmitted from each fabrication machine. A fabrication line data management unit 242 for collecting the result data are collected from the respective fabrication machines and for storing them in the result management database 241 is shown independently. The function of the fabrication line data management unit 242, similar to a case of recording other result data, may be given to the respective fabrication machines and the result management database 241. In addition, the fabrication machinery group of the invention includes a test data management unit 243 for collecting test data from all types of inspection machines or testers, recording and managing the data. This function of the test data management unit 243 may be given to the respective inspection machines, testers, or the result management database 241.

As shown in this embodiment, a certain process may use plural fabrication machines performing the same process, e.g., CVD (Chemical Vapor Deposition) machine I and II, photolithography machines I to IV, etc.

FIG. 3 illustrates a definition list of machine code numbers for identifying the respective fabrication machines in FIG. 2 uniquely. The first row in the list has machine code numbers, and the second row in the list indicates has names of the machines. For example, an etching machine I is defined as a machine code number 141 and recorded as such in the list.

Figure 1:
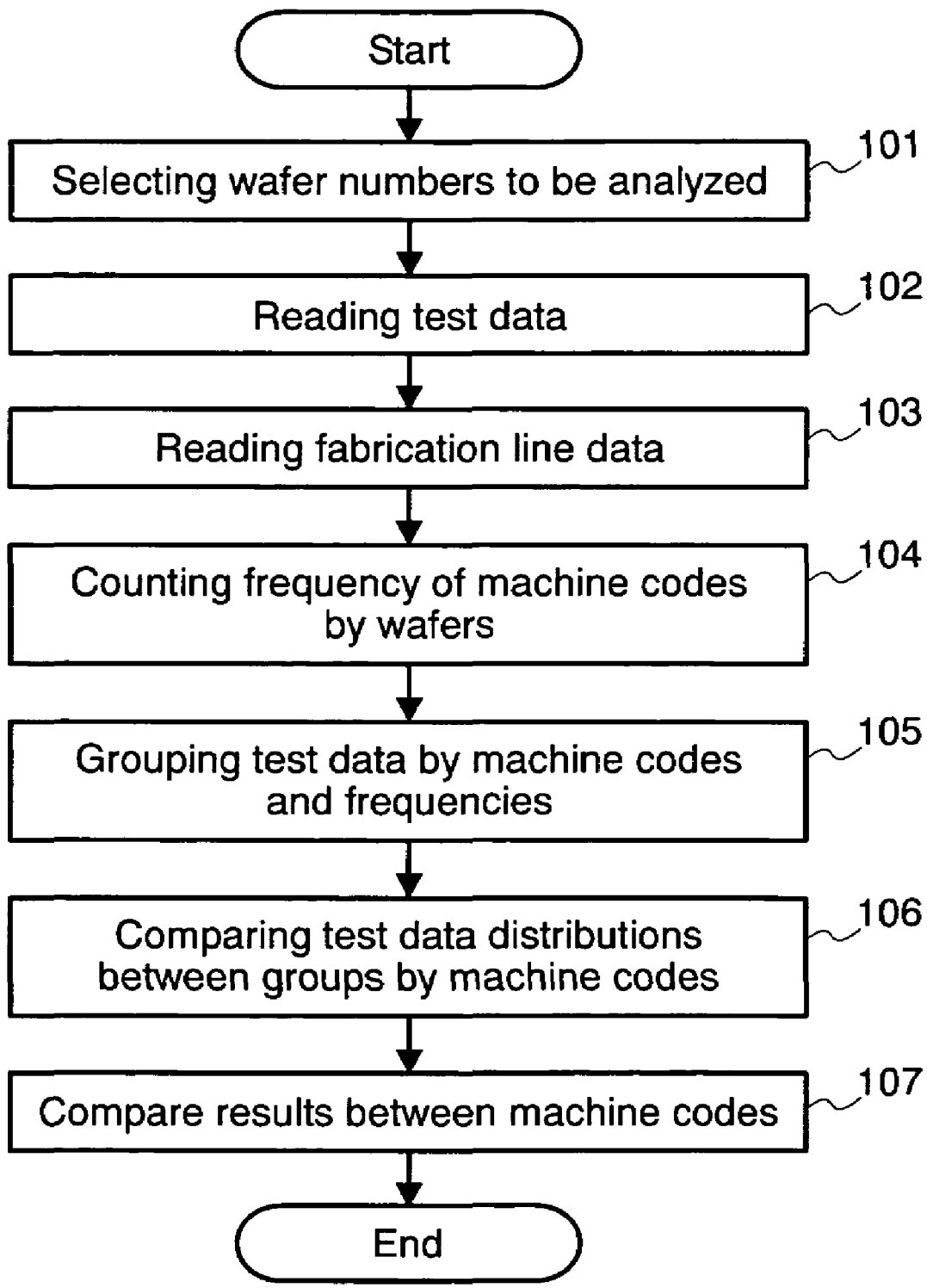
FIG. 1 is a flowchart describing how to process a test data
analyzing program in accordance with an embodiment of the
present invention.

FIG. 1 illustrates a flowchart of processing a test data analyzing program to which the invention is applied. In step 101 (Selecting wafer numbers to be analyzed), plural wafer numbers to be analyzed are selected. A wafer number is a unique identification code number of a wafer in the fabrication line. Next in step 102 (Reading test data), test data corresponding to the wafer numbers are read. In step 103 (Reading fabrication line data), fabrication line data corresponding to the plural wafer numbers selected in step 101 are read. Fabrication line data is information about machines each wafer passes through in the fabrication process or chambers in the machines. That is, fabrication line data include machine code numbers shown in FIG. 3, so they differ by wafers. In step 104 (Counting frequency of machine codes by wafers), frequency of machine code numbers of the respective wafers is counted from the fabrication line data read in step 103. In step 105 (Grouping test data by machine codes and frequencies), test data are grouped by machine code numbers or by showing frequencies thereof.

In step 106 (Comparing test data distributions between groups by machine codes), test data distributions between groups are compared by machine code numbers, that is, by showing frequencies thereof.

In detail, for example, a yield distribution of a wafer group where the etching machine II is used once and a yield distribution of a wafer group where the same etching machine II is used twice are compared for ANOVA (Analysis of variance), and a significance probability P value is calculated. Moreover, a coefficient of correlation is calculated from a scatter diagram in which the showing frequency of the machine code numbers are set to the horizontal axis and wafer yields are set to the vertical axis. Next, in step 107 (Comparing results between machine codes), P values of machine code numbers whose coefficients of correlation calculated in step 106 are minus are compared. A machine code number with the lowest P value is taken, or machine code numbers are arranged in increasing order of P values. In this manner, one can narrow down the range of defect causes of the fabrication machines.

The following will now describe a conception of narrowing down the range of defect causes of the fabrication machines by the above-described process of the test data analyzing program. According to the statistical hypothesis testing, a null hypothesis (a hypothesis to be nullified or refuted in order to support or accomplish a research or experimental object of an investigator) is set up as "a fabrication machine to be tested is operated normally, and pobability of causing a defect is small within a range to be determined as normal." Among the respective wafers processed by such fabrication machine, a yield distribution of wafer groups obtained by using the fabrication machine once (production yield of plural semiconductor chips formed on the respective wafer) and a yield distribution of wafer groups obtained by using the same fabrication machine twice are obtained from test data. If available, a yield distribution of wafer groups obtained by using the same fabrication machine three times is also studied. These yield distributions of wafer groups are regarded as ones that are obtained by gathering a sample of a certain size from a normal population. From these two sample distributions, it is tested as follows whether the distributions of two populations are the same.

(1) Unbiased estimate of population variance $U_1$ (an estimate of population variance obtained from sample data) is obtained by $$U_1 = \Sigma(x_{1i} - x_{1m})^2/(n_1 - 1) \tag{1}$$

where, $n_1$ is the number of data (number of wafers) of wafer groups that used a fabrication machine once, $x_{1i}$ is a yield of each wafer (sample data), and $x_{1m}$ is a sample mean.

(2) Unbiased estimate of population variance $U_2$ (an estimate of population variance obtained from sample data) is obtained by $$U_2 = \Sigma(x_{2i} - x_{2m})^2/(n_2 - 1) \tag{2}$$

where, $n_2$ is the number of data (number of wafers) of wafer groups that used a fabrication machine twice, $x_{2i}$ is a yield of each wafer (sample data), and $x_{2m}$ is a sample mean.

(3) Statistic $F_0 = U_1/U_2$ \hfill (3)

(4) $F_0$ follows F distribution with the first DOF (Degree of freedom) $\Phi_1 = n_1 1$ and the second DOF $\Phi_2 = n_2 - 1$. From the F distribution table, significance probability $P = \Pr\{F \geqq F_0\}$, which is the probability of showing the statistic $F_0$ (variance ratio), is obtained.

(5) According to the statistical hypothesis testing, if $\alpha$, the ratio of risk of testing (significance level), is 0.05 for example it is set to $\alpha/2$ for two-sided testing, and $\alpha$ for one-side testing.

When $P > \alpha$, a null hypothesis is selected: "One cannot say that population variances of two groups are not the same."

When $P \leqq \alpha$, a null hypothesis is rejected: "Population variances of two groups are not the same."

The invention is not to set the ratio of risk of testing (significance level), i.e., $\alpha$. Instead, it decides that a fabrication machine with the lowest significance probability P-value has a higher probability to cause a defect. This is because it is believed that fabricating wafers with a fabrication machine that causes a defect has largest influence on the yield distribution of wafers and variance of the distribution.

(6) A coefficient of correlation in a scatter diagram having the showing frequency (usage frequency of fabrication machines) set to the horizontal axis and wafer yield the vertical axis is calculated.

Although the coefficient of correlation is one of indices representing the strength of the relation between two variates X and Y, the coefficient of correlation $R_{XY}$ may be obtained by following:

$$R_{XY} = \frac{S_{XY}}{\sqrt{S_X S_Y}} = \frac{\sum (X_i - X_m)(Y_i - Y_m)}{\sqrt{\sum (X_i - X_m)^2 \sum (Y_i - Y_m)^2}} \quad (4)$$

where, $S_{XY}$ is a covariance and $S_X$ and $S_Y$ are standard deviations.

$R_{XY}$ has a value between −1 and 1, i.e., $-1 \leq R_{XY} \leq 1$. The closer the absolute value of R to 1, it is decided that a strong correlation exist. However, one cannot decide only by the coefficient of correlation whether the coefficient of correlation has a meaning. The invention suggests a method for specifying a fabrication machine that causes a defect, which consequently narrows down the range of fabrication machines that have lower wafer yields despite their higher usage frequencies. That is, significance probability P values of machine code numbers with minus coefficients of correlation are compared with each other.

FIG. 4 illustrates fabrication line data being read in step 103. In this embodiment, fabrication line data corresponding to wafer numbers are shown. Fabrication line data of each wafer including grade name of the IC, wafer number and No. of processes performed on the wafer are recorded in a header unit. In addition, a data unit also records the date and hour each process is performed, process code numbers, machine code numbers, and process names. For instance, by reading the fabrication line data, one can find out that the wafer number A1540-03 underwent a LOCOS coating process on Feb. 2, 2004 and a wiring 2 coating process on Feb. 19, 2004 using the same coating machine II. Step 104 in FIG. 1 lists machine code numbers included in the fabrication line data according to numbers.

Showing frequency is calculated by machine code numbers defined in FIG. 3, e.g., how many times the photolithography machine I of the machine code number 131 has been used or how many times the resist stripping machine II of the machine code number 172 has been used.

FIG. 5 illustrates test data being read in step 102 of FIG. 1. In this embodiment, test data are classified by wafers. Test data of each wafer including grade name of the IC and wafer number are recorded in the header unit, and inspection items done on the wafer are recorded on the inspection step unit. In addition, the data unit has inspection results of the respective inspection items recorded in the inspection step unit. Here, the wafer A1540-03 of the example 271 undergoes inspection J, test A and test B, whereas the wafer A1541-02 of the example 272 undergoes inspection K, test A and test B. Therefore, it is common that wafers undergo different inspections or tests.

FIG. 6 illustrates a GUI (Graphical User Interface) displayed on an output unit 257 when the program in FIG. 1 is executed in the test data analysis machine 251. A product name is inputted to 300, and a process being the starting point of search is set to 301. In addition, from which month which day to which month which day a wafer underwent the process designated in 301 are inputted to 302 and 303, respectively. Also, to specify an object wafer, two digits after the wafer number are selected. In this embodiment, ASIC-001 is inputted to 300, test A-Yield is selected in 301, Feb. 1, 2004 is inputted to 302, Feb. 3, 2004 is inputted to 303, and 02, 03 and 04 after the wafer number are selected in 304. The above is a rough choice of the wafer number in step 101 of FIG. 1. Next, when the SEARCH button of 306 is clicked, step 102 is executed and thus, test data shown in FIG. 5 are read. 305 displays test data being read at the choice of the wafer number. From this display result, one can specify an object wafer by selecting the wafer number. When the ANALYSIS button of 307 is clicked, steps 103 through 107 are executed and it is transited to the image in FIG. 7. In addition, 310 indicates a print button and 311 indicates an end button.

Figure 7:
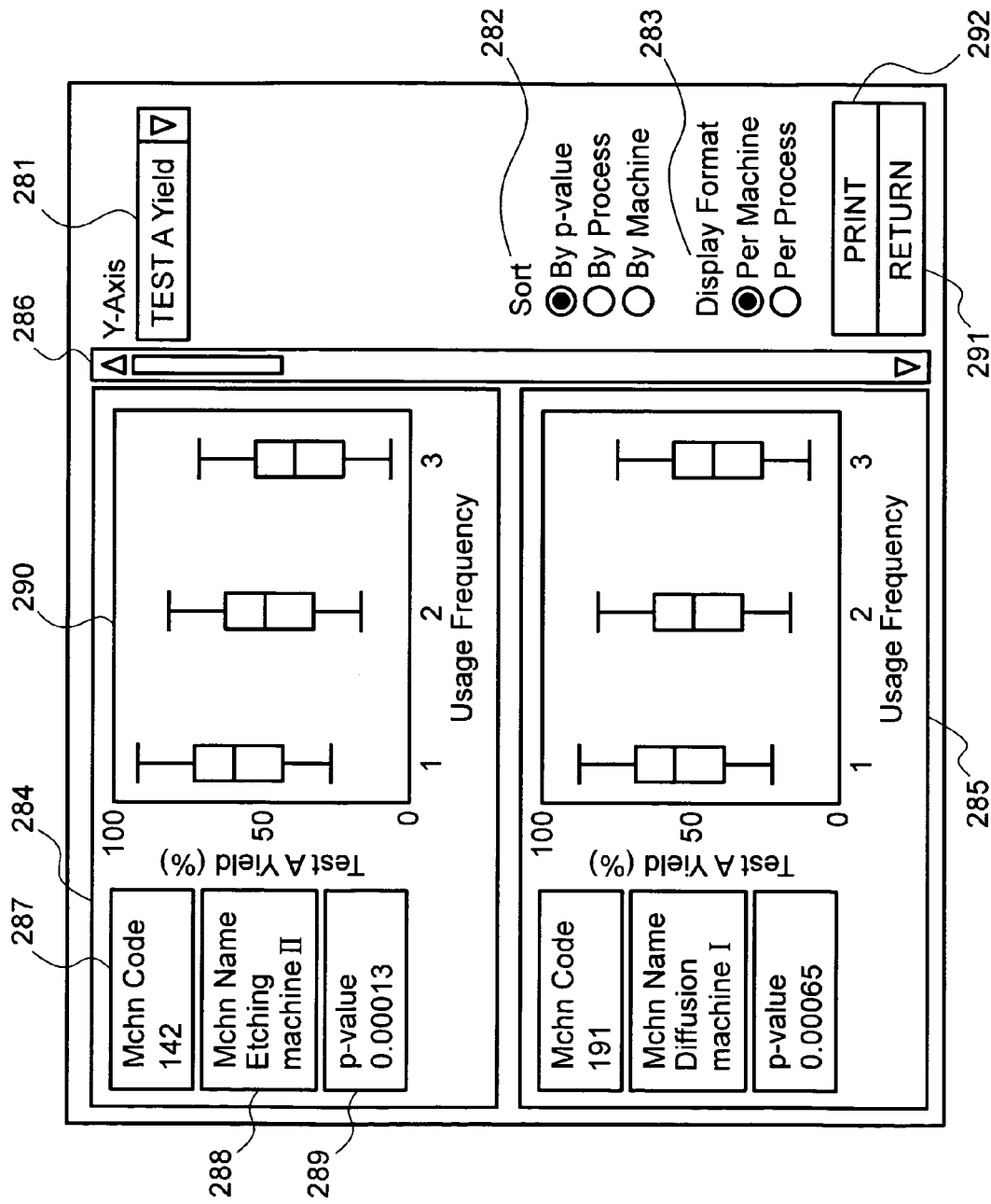
FIG. 7 illustrates another example of Graphical User Inter-
face.

Similarly, FIG. 7 illustrates a GUI (Graphical User Interface) displayed on an output unit 257 when the program in FIG. 1 is executed in the test data analysis machine 251. The image in the drawing shows the results of steps 103 through 107 after the ANALYSIS button of 307 is clicked. Although the input of 301 is automatically inputted to 281, it is also possible to change to pull down. The process designated in 281 becomes an inspection item to be done on an analysis object (or target). 282 and 283 are conditions of a screen display. In this particular embodiment, in step 106, test data are compared and sorted by P values (significance probabilities) and results by machines are displayed on the screen. That is, choosing to sort by P values in 282 corresponds to step 107. 284 displays the result of the lowest P value, i.e. the result of a fabrication machine with the highest probability to cause a defect, and 285 displays the result of the second lowest P value, i.e. the result of a fabrication machine with the second highest probability to cause a defect. Further, one can switch the result in order of P values using the scroll bar of 286. Inside of 284 displays an object machine code number on 287, its machine name 288, P value in step 106 289, and a graph of results 290. The example of 290 shows box-and-whisker plot, in which the vertical axis represents inspection items selected and the horizontal axis represents usage frequencies of fabrication machines the machine code numbers indicate. In the example of 290, for instance, there are three kinds of groups for the etching machine II under the machine code number 142 among the groups prepared in step 105, i.e., a group having only one machine code number 142 in the fabrication line data by wafers, a group having two machine code number 142s in the fabrication line data, and a group having three machine code number 142s in the fabrication line data.

In the drawing, 291 indicates a return button and 292 indicates a print button.

Figure 8:
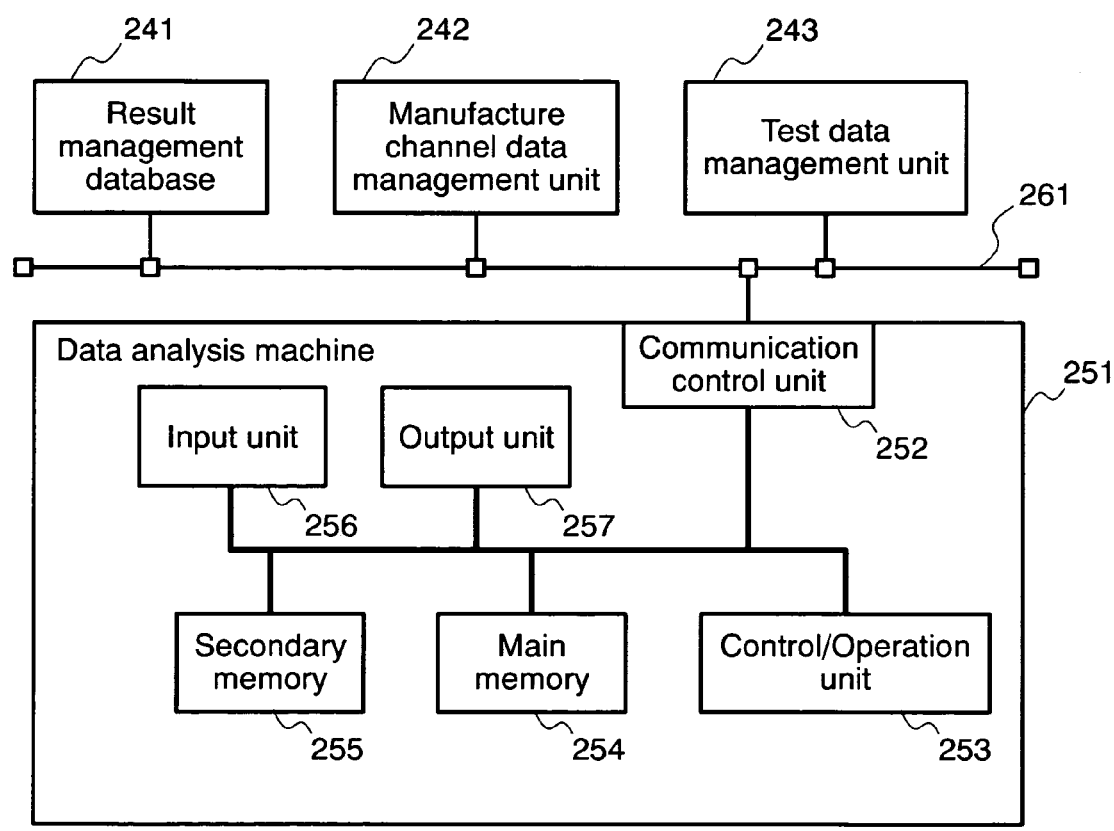
FIG. 8 illustrates a hardware configuration for executing an
embodiment of the present invention.

FIG. 8 is a block diagram illustrating a hardware configuration for executing the program of the invention. A test data analysis machine 251 is connected to a result management database 241 through a LAN 261. The test data analysis machine 251 includes a communication control unit 252, a control/operation unit 253, a main memory 254, a secondary memory 255, an input unit 256 such as a keyboard or a mouse, and an output unit 257 such as a display or a printer. Fabrication history data or test data stored in the result management database 241 are inputted to the test data analysis machine 251 through the LAN 261 and the communication control unit 252. In addition, the fabrication history data or the test data are stored in the secondary memory 255. The program in FIG. 1 is stored in the secondary memory 255 in advance, and is read by the main memory 254 for execution. The fabrication history data or the test data stored in the secondary memory 255 are read by the secondary memory 255 in step 102 or step 103 in FIG. 1. The fabrication line data management unit 242 collects fabrication line data of wafers from the respective fabrication machines, and stores them in the result management database 241. In addition, a test data management unit 243 collects test data from all inspection machines or testers, and records and manages them in the result management database 241.

So far, one embodiment of the invention applied to the IC fabrication process has been explained. The present invention can be advantageously used not only for the fabrication process of IC on a wafer, but also for estimating defect causes in a liquid crystal display which uses a glass substrate instead of a wafer or defect causes in other types of products.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A test data analyzing system for estimating a fabrication machine that makes a defect cause in a product that is fabricated through plural processes, including two or more repetitions, the system comprising:
    a fabrication line data management unit, which records information of machine code numbers specifying fabrication machines that process the product in a time series, as fabrication line data for the respective products;
    a test data management unit, which stores test data obtained from an inspection done on the product by an inspection machine; and
    a data analysis unit, which (1) presents a user interface that displays the list of the products and the test data to a user, accents the input of the selection of the product and the inspection items by the user, (2) reads a fabrication line data of each of the selected products, groups the products per each machine code number per usage frequency of the fabrication machine, (3) reads the test data of the selected inspection item corresponding to each product to prepare a test data distribution for each group, (4) calculates a significance probability P value from the ratio between each variance of the test data distribution per usage frequency of the fabrication machine by machine code numbers, (5) displays a box-and-whisker plot of the usage frequency of the fabrication machine and the test data, on a basis of an order sorted by the significance probability P value as designated by a user.

2. The system of claim 1, wherein the data analysis unit selects, as a candidate of a fabrication machine with a defect cause, only the machine code number that has a minus coefficient of correlation in a scatter diagram with the horizontal axis representing usage frequency of the fabrication machine and the vertical axis representing test data.

3. A test data analyzing method for supporting a user to estimate a fabrication machine creating a defect cause in a product that is fabricated through plural processes, including two or more repetitions, the method comprising:
    presenting a user interface that displays a list of products and test data to the user and accepting input of a selection of a product and inspection items by the user;
    reading fabrication line data that includes information of machine code numbers specifying fabrication machines that process the product in a time series;
    reading test data obtained from an inspection on the product by an inspection machine;
    grouping products, according to the fabrication line data, per each machine code number per usage frequency of the fabrication machine, and preparing a test data distribution of the respective groups;
    calculating a significance probability P value from the ratio between each variance of the test data distribution per usage frequency of the fabrication machine by the machine code numbers; and
    displaying box-and-whisker plot of the usage frequency of the fabrication machine and the test data, on a basis of an order sorted by the significance probability P value as designated by the user.

4. The test data analyzing method of claim 3, wherein the significance probability P value is calculated by selecting, as a candidate of a fabrication machine with a defect cause, only the machine code number that has a minus coefficient of correlation in a scatter diagram with the horizontal axis representing usage frequency of the fabrication machine and the vertical axis representing test data.

5. A computer-readable medium containing a test data analyzing program for supporting a user to determine a fabrication machine creating a defect cause in a product that is fabricated through plural processes, including two or more repetitions, the program, when implemented, causing operations comprising:
    presenting a user interface that displays a list of products and test data to the user, and accepting input of a selection of a product and inspection items by the user;
    reading fabrication line data that includes information of machine code numbers specifying fabrication machines that process the product in a time series;
    reading test data obtained from an inspection on the product by an inspection machine;
    grouping products, according to the fabrication line data, per each machine code number per usage frequency of the fabrication machine, and preparing a test data distribution of the respective groups;
    calculating a significance probability P value from the ratio between each variance of the test data distribution per usage frequency of the fabrication machine by the machine code numbers; and
    displaying a box-and-whisker plot of the usage frequency of the fabrication machine and the test data, on a basis of an order sorted by the significance probability P value as designated by the user.

6. The computer-readable medium of claim 5, wherein the significance probability P value is calculated by selecting, as a candidate of a fabrication machine with a defect cause, only the machine code number that has a minus coefficient of correlation in a scatter diagram with the horizontal axis representing usage frequency of the fabrication machine and the vertical axis representing test data.

* * * * *